UNITED STATES PATENT OFFICE.

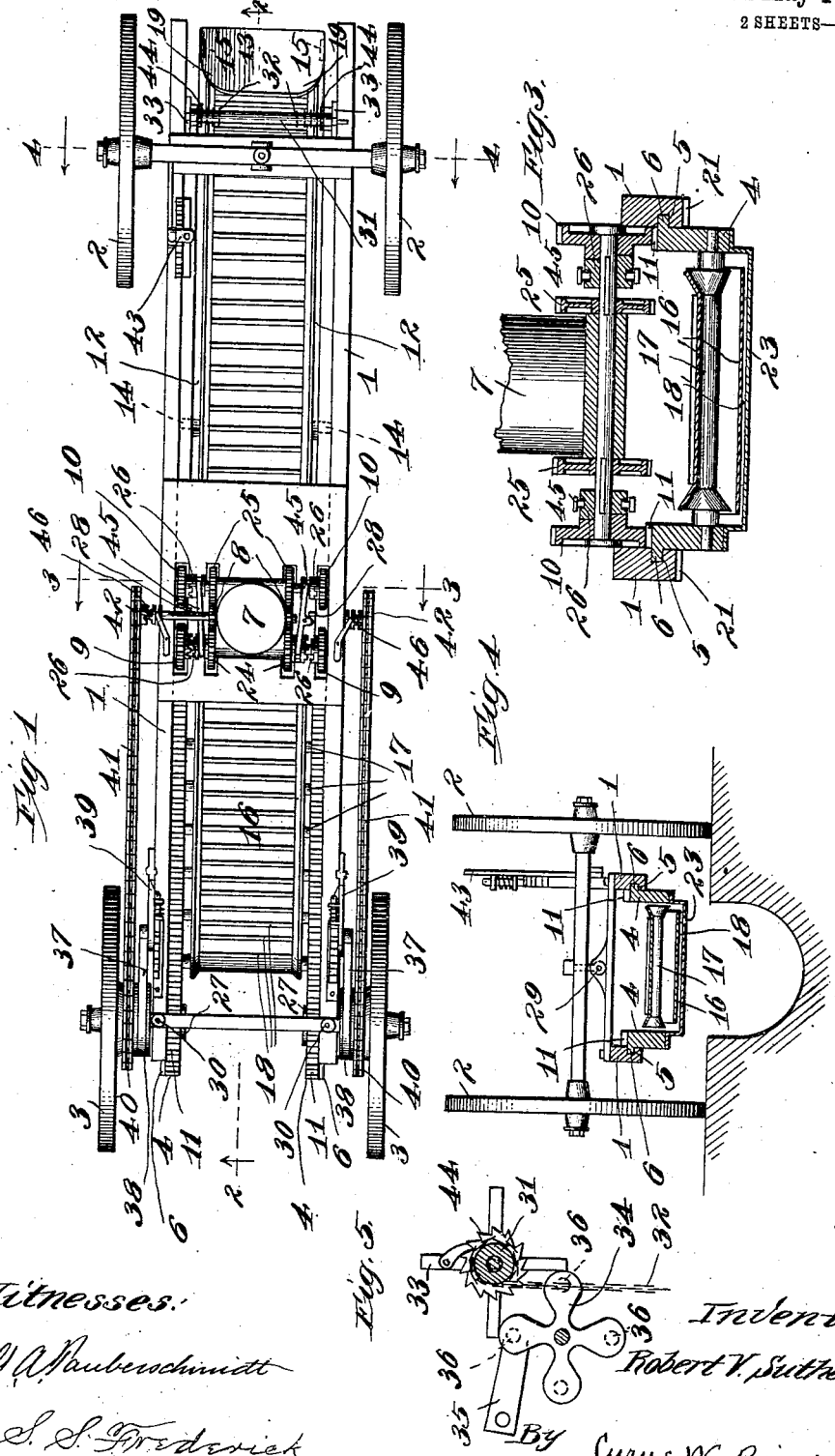

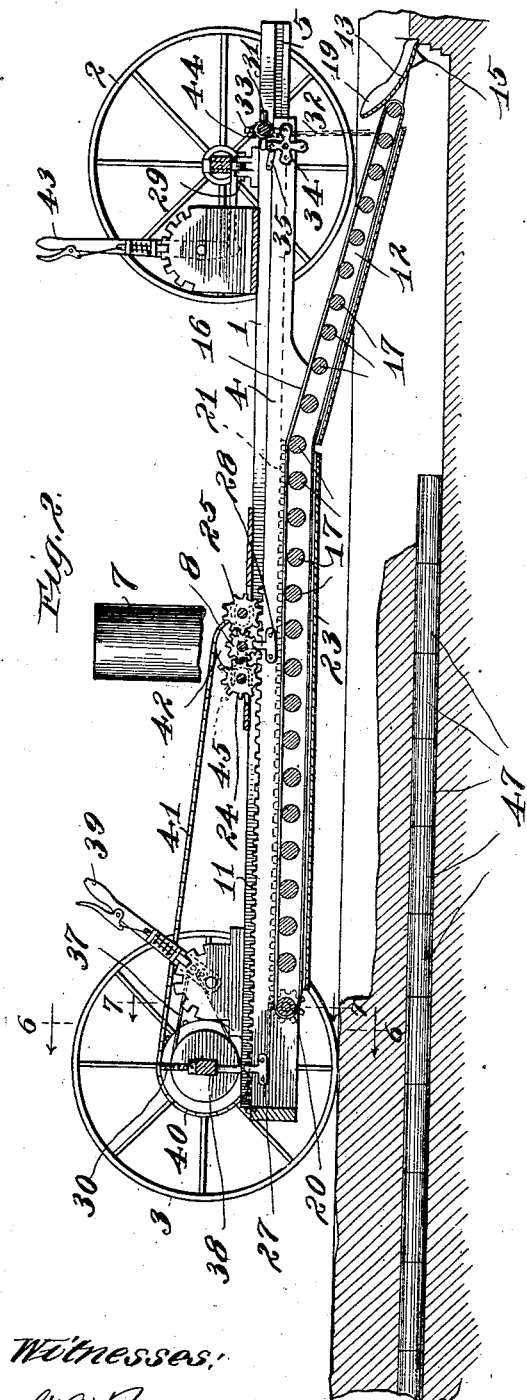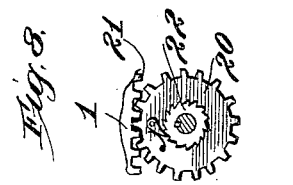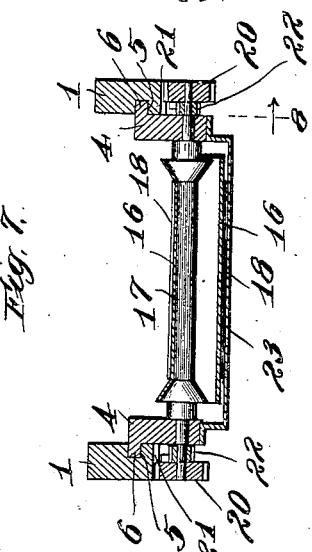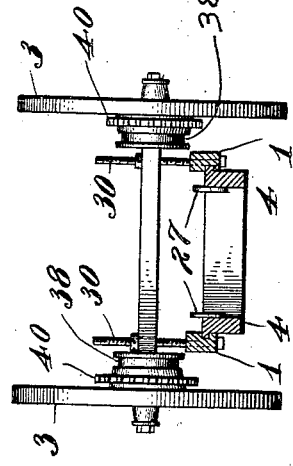

ROBERT V. SUTHERLAND, OF SWEA TOWNSHIP, KOSSUTH COUNTY, IOWA.

DITCHING-MACHINE.

No. 921,178.          Specification of Letters Patent.          Patented May 11, 1909.

Application filed September 6, 1907. Serial No. 391,566.

*To all whom it may concern:*

Be it known that I, ROBERT V. SUTHERLAND, a citizen of the United States, and resident of the township of Swea, in the county of Kossuth and State of Iowa, have invented certain new and useful Improvements in Ditching-Machines, of which the following is a specification.

The object of my invention is to provide a ditching machine which shall be simple in construction and effective in operation, and which will be capable of excavating and at the same time filling a previously excavated section of the ditch, simultaneously with which operations tile pipe, etc. may be laid in the ditch. These objects are attained by, and my invention is embodied in the following described mechanism.

In the accompanying drawings, Figure 1 is a plan view of my ditching machine; Fig. 2 is a vertical longitudinal section thereof on line 2—2 of Fig. 1; Fig. 3 is a vertical cross section thereof on line 3—3 of Fig. 1. Fig. 4 is a vertical cross section thereof on line 4—4 of Fig. 1; Fig. 5 is a detail view of mechanism for lowering and raising the shovel; Fig. 6 is a vertical cross section of my ditching machine on line 6—6 of Fig. 2; Fig. 7 is a vertical cross section thereof on line 7—7 of Fig. 2; and Fig. 8 is a detail view of mechanism by which the earth conveyer is operated.

On the main body of the machine or vehicle body 1, mounted on wheels 2 and 3, the shovel-operating frame 4 reciprocates longitudinally in suitable bearings as the grooves 5 in the main body and the ribs 6 of the shovel-operating frame sliding therein. This motion is imparted by any suitable source of power carried on the main body, as indicated by the motor 7, operating by suitable means, as by the cog-wheel 8 meshing with the cog-wheels 24 and 25 and operating through reversing gears the cog-wheels 9 or 10 which mesh with the rack 11 carried by the shovel-operating frame. This shovel-operating frame has toward its forward end a shovel-bearing member 12 (carrying the shovel 13) which is pivoted at 14 on the main member 4 of the shovel-operating frame to allow the shovel to be raised and lowered. This shovel 13 has preferably the downwardly projecting knives 15 on either side to cut on both sides at each forward movement of the shovel the earth to be removed at the next forward movement of the shovel.

A suitable earth conveyer is carried by the shovel-operating frame preferably of the form illustrated, in which the belt 16 traveling on rollers 17 and provided with cross ribs 18 for retaining the excavated earth, receives this earth behind and below the shovel (which is provided with wings or guides 19) and carries it backward depositing it near the rear of the shovel-operating frame while the same is traveling forward in making the cut. The belt is moved by the forward movement of the shovel-operating frame, by means of the cog-wheel 20 carried by the shaft of a roller 17, which engages the rack 21 carried by the main body 1. A suitable ratchet 22 stops the motion of the belt in the back movement of the shovel-operating frame. The ends of the rollers 17 are preferably of larger diameter as shown to turn up the sides of the belt and prevent the escape of the earth. To prevent sagging, the belt preferably slides on a suitable plate or floor 23 carried by the shovel-operating frame.

Suitable reversing gear of common form comprising the cog-wheels 24 and 25, and the clutches 26 and clutch operating levers 45, serves to automatically reverse the travel of the shovel-operating frame, by the lugs 27 and 28 (carried by the main body) striking and operating the clutch levers 45.

A suitable device is provided for automatically lowering the shovel a proper distance for each succeeding cutting of the earth. This is preferably as shown, viz: A drum 31 on which are wound the shovel supporting chains 32 carries the four radially membered intermittent wheel 33 one member of which rests on and is supported by one of the members of the corresponding four radially membered intermittent wheel 34, all which are carried by the shovel-operating frame. When the shovel-operating frame has reached approximately the rear end of its travel, the pawl 35 pivoted on the main body strikes one of the pins 36 of the wheel 34 and rotates it sufficiently to allow the member of the wheel 33 which rests thereon to pass into the next recess of the wheel 34, thus causing the succeeding member of the wheel 33 to rest on the corresponding succeeding member of the wheel 34, by which operation both wheels are turned a quarter way around and the shovel is lowered for the next earth cut. When the required depth has been reached the shovel is raised to the earth surface, as by a removable crank operating on the drum shaft provided with a ratchet 44.

The main body may be adjusted to an approximate level by suitable means as the pivot 29 below the front axle and the screws 30 at the rear axle.

Suitable means are provided to secure the entire machine in a fixed position to resist the back pressure of the cutting action of the shovel; these are preferably the friction bands 37 operating on the hubs 38 of the rear wheels by the levers 39. Suitable means are also preferably provided for moving the entire machine by its own power, as by the sprockets 40, chains 41, clutches 46, and sprockets 42. The machine may be guided by the lever 43 operating as shown to turn the front axle.

My ditching machine is operated as follows: Fig. 2 represents the machine in operation at the beginning of a cut on a section of ditch which is excavated to about one half its required depth. The machine is secured in position by the friction bands 37 and the main body adjusted to an approximate level by the screws 30. The entire shovel-operating frame is then moved forward by the power 7 and cuts a slice of earth which is carried by the conveyer belt and deposited at its rear end in the ditch cut at the previous setting of the machine, and over the tile pipe 47 which have been already laid. The driving gear being reversed by the lug 27 at the end of the forward travel of the shovel-operating frame, the shovel-operating frame moves automatically back, the belt conveyer idling, until the rear end of its travel is reached, when the lug 28 reverses the travel, the shovel is lowered a short distance by the pawl 35, and the cutting operation is repeated. During the cutting of this section of the ditch, tile pipe are laid in the section already cut and between the part being cut and that being filled at each setting. When the required depth is reached the shovel is raised by turning the drum 31 and the entire machine is moved forward to excavate the next section.

It is evident that my invention may be embodied in varying mechanisms, and I do not propose to confine myself to the details of construction shown and described further than as pointed out in the claims.

I claim:

1. In a ditching machine, the combination of a main body, a shovel, and means for reciprocating the shovel in direct and parallel lines of different depths.

2. In a ditching machine, the combination of a main body, a shovel-operating frame reciprocating thereon, a shovel, and means for automatically lowering the shovel.

3. In a ditching machine, the combination of a main body, a shovel-operating frame reciprocating thereon, a shovel, means for automatically lowering the shovel, and an automatic conveyer to carry the excavated earth backward.

4. In a ditching machine, the combination of a main body, a shovel-operating frame reciprocating thereon and having a shovel-bearing member pivoted to the shovel-operating frame and adapted to be raised and lowered, a shovel, means for raising and lowering the shovel-bearing member, and a conveyer for carrying the excavated earth backward.

5. In a ditching machine, the combination of a main body, a shovel-operating frame reciprocating thereon, a shovel, a conveyer for carrying the excavated earth backward, and means for automatically lowering the shovel a determined distance when the shovel-operating frame has reached approximately the rear end of its travel.

6. In a ditching machine, the combination of a main body, a shovel-operating frame reciprocating thereon, a shovel-bearing member pivoted on the shovel-operating frame, a shovel, an automatic belt conveyer for carrying the excavated earth backward, means for automatically lowering the shovel-bearing member a determined distance when the shovel-operating frame has reached approximately the rear end of its travel, and means for automatically reversing the travel of the shovel-operating frame in both directions.

7. In a ditching machine, the combination of a main body, a shovel-operating frame reciprocating thereon, a shovel-bearing member pivoted on the shovel-operating frame, a shovel, an automatic belt conveyer for carrying the excavated earth backward, means for automatically lowering the shovel-bearing member a determined distance when the shovel-operating frame has reached approximately the rear end of its travel, means for automatically reversing the travel of the shovel-operating frame in both directions, and means for adjusting the plane of the reciprocation of the shovel-operating frame.

8. In a ditching machine, the combination of a main body, a shovel-operating frame reciprocating thereon, a shovel, and an earth-conveyer extending backward from the shovel to a distance approximately twice the travel of the shovel-operating frame, to carry the excavated earth from the shovel and distribute it by the movement of the shovel-operating frame in a previously excavated portion of the ditch.

In witness whereof, I have hereunto signed my name in the presence of two subscribing witnesses.

ROBERT V. SUTHERLAND.

Witnesses:
F. S. McELHERNE,
ST. CLAIR L. HITE.